April 12, 1955  J. O. DOCKINS  2,706,047
RICE GRADER
Filed April 5, 1951  3 Sheets-Sheet 1
FIG. 1.
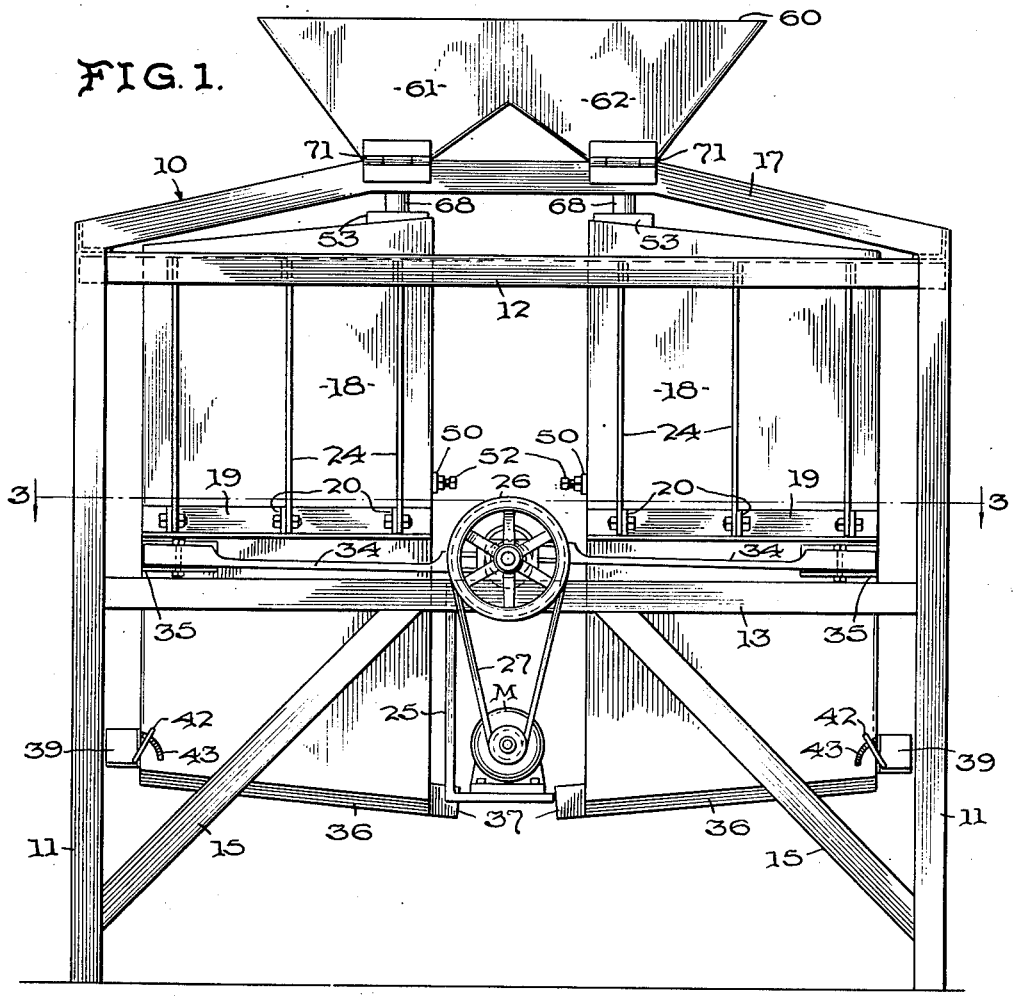
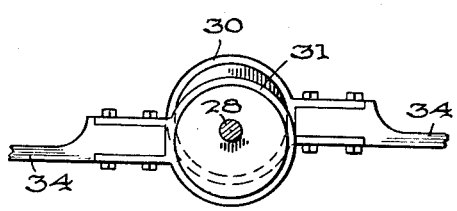
FIG. 9.
INVENTOR.
JAMES O. DOCKINS
BY
*Raymond N. Matson*
AGENT April 12, 1955   J. O. DOCKINS   2,706,047
RICE GRADER Filed April 5, 1951   3 Sheets-Sheet 2

INVENTOR.
JAMES O. DOCKINS
BY
Raymond N. Watson
AGENT

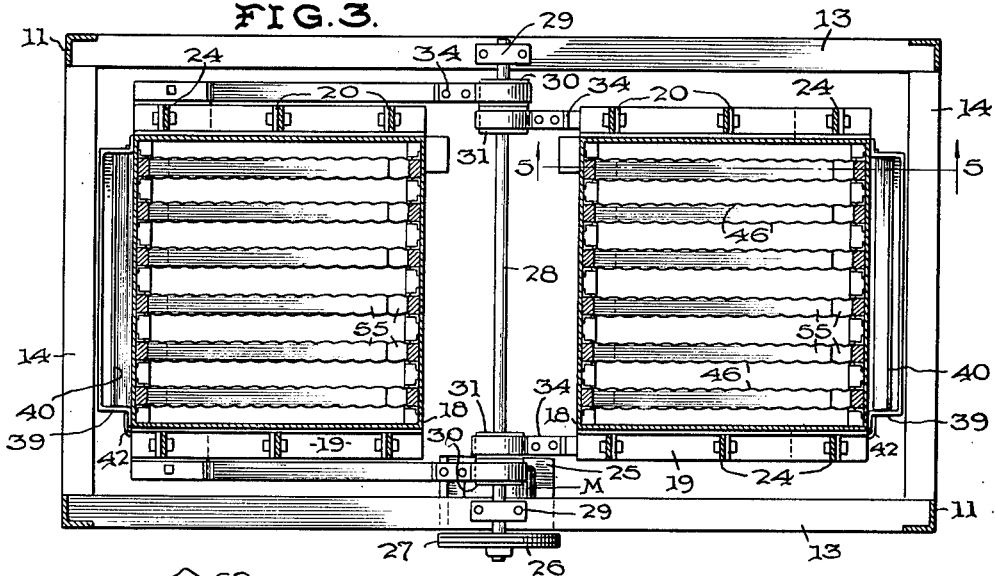
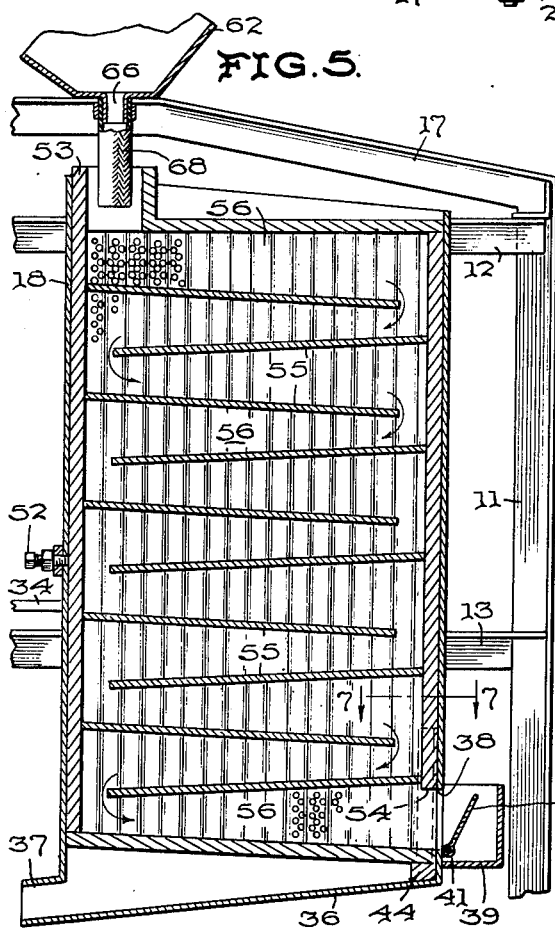
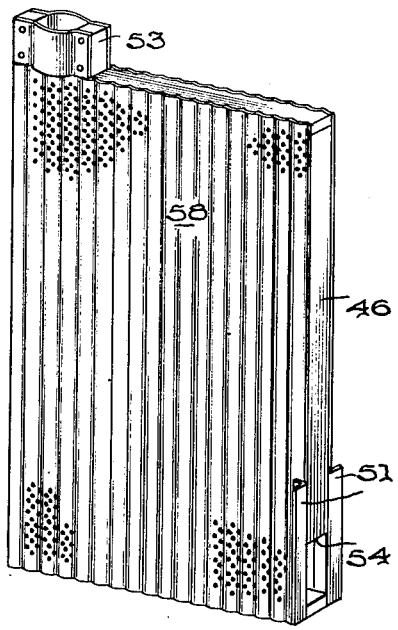

2,706,047
Patented Apr. 12, 1955

2,706,047
RICE GRADER
James O. Dockins, Stuttgart, Ark.

Application April 5, 1951, Serial No. 219,372

8 Claims. (Cl. 209—360)

This invention relates generally to a grading apparatus and more particularly to an improved oscillating type rice grader which has interchangeable parts so as to also grade various other types of seeds with great speed and efficiency.

Seed-grading apparatus are well known in the art and in general, are characterized by a number of objectionable features. Among these are an unnecessary bulkiness and cumbersomeness in view of their output; a tendency to become inefficient or inoperative during grading operations due to clogging, etc.; a lack of ruggedness resulting in failure of the apparatus; a lack of flexibility of use for different types of seeds; and an unnecessarily high initial cost and maintenance.

Accordingly, the chief object of the present invention is to provide a seed grading apparatus which will obviate the foregoing and other disadvantages characterizing prior art structures.

Another important object of the present invention is to provide a seed grading apparatus having features so related as to provide a faster more efficient volume grading of various types of seed.

A further important object of the present invention is to provide an improved screen unit for seed grading apparatus.

A still further important object of the present invention is to provide a seed grading apparatus having improved operating characteristics and grading control devices.

Another important object of the present invention is to provide a seed grading apparatus for various types of seeds which is simple and rugged in construction, of long life and economical in cost and maintenance, and flexible as to seed grading operations of different types.

Other objects and advantages of the invention will become apparent during the course of the following description.

In the drawings, I have shown one embodiment of the invention. In this showing:

Figure 1 is a front elevation of the seed grading apparatus comprising the present invention;

Figure 3 is a horizontal sectional view of the seed grader taken on the line 3—3 of Figure 1;

Figure 5 is a central vertical sectional view taken on the line 5—5 of Figure 3 of one of the screen units mounted in operative position in a shaker box;

Figure 6 is a perspective view of one of the screen units;

Figure 9 is a fragmentary elevational view of the eccentrics and driving shaft and shaker arms for oscillating the shaker boxes.

Figure 2:
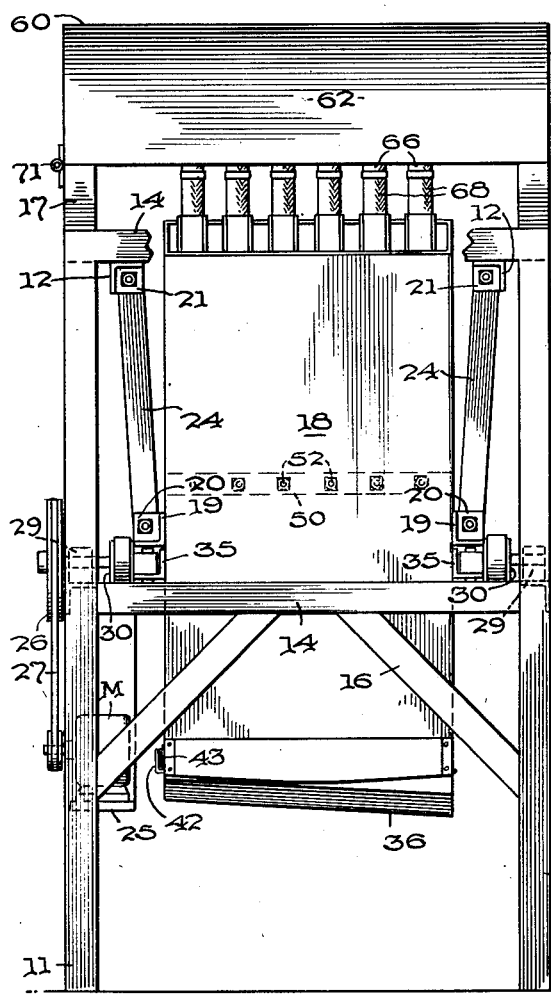
Figure 2 is an elevational view, parts being broken away, of the right end thereof.
Figure 4:
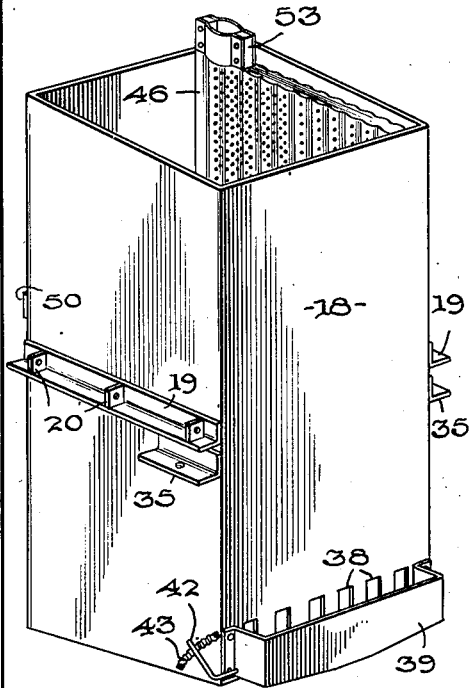
Figure 4 is a perspective view of one of the two shaker boxes forming a part of the invention.

Referring to the drawings, numeral 10 generally indicates the seed grader which is supported on a strong box frame comprising legs 11 connected longitudinally by upper front and rear angle members 12, lower front and rear angle members 13, and upper and lower end angle members 14. A hopper supporting truss-like frame section 17 extends above the front and rear frame members 12 and 13 and also connects the end frame members 14. The lower portions of the legs 11 are connected to the frame members 13 and 14 by braces 15 and 16 respectively so that a very strong although relatively light supporting frame is thus provided.

A pair of shaker boxes 18 are mounted in opposite sides of the frame and inasmuch as these are interchangeable being identical in construction although oppositely disposed, only one need be described. Angle bars 19 are fixed to the front and rear of the shaker boxes 18 at substantially their midpoints and a plurality of spaced brackets 20 are fixed thereto. The boxes are suspended from a plurality of similarly spaced brackets 21 fixed to the frame members 12 by means of straps 24 (Figures 1–3 inclusive).

An L-shaped bracket 25 depends from the frame member 13 between the shaker boxes 18 and supports a motor M which is drivably connected to a pulley 26 by means of a belt 27. The pulley 27 is keyed to a drive shaft 28 which extends transversely of the frame and is suitably journalled thereon by means of bearings 29.

Two pairs of eccentrics 30 and 31 (Figures 2, 3 and 9) are fixed to the shaft 28 adjacent the bearings 29 and are operatively connected with the midpoint of the shaker boxes 18 by means of arms 34 secured to shaker box brackets 35 or if desired, to the angle bars 19. It will be noted that the eccentrics 30 are angularly displaced 180 degrees with respect to the eccentrics 31 so that the oscillation of the boxes in a substantially horizontal plane will be in opposition to each other and thus any vibration of the apparatus during operation will be substantially balanced out. While the hanger straps 24 and the shaker arms 34 are formed of a strong, substantially rigid material, their length permits sufficient flexibility to enable oscillation of the shaker boxes by the eccentrics 30 and 31 without binding of the parts. Moreover, it will be apparent that there will be no tendency of the shaker boxes to twist during oscillation due to their suspension at and the connection of the arms at their midpoint. Obviously a crankshaft and crank arms could be substituted for the eccentrics and arms shown.

The bottoms 36 of the shaker boxes are inclined as seen in Figures 1 and 2 toward the rear central portion of the apparatus and the lower-most corner of the inner side walls at the rear are provided with a single discharge aperture or spout 37 (Figure 5) while the outer sides are provided with horizontally spaced ports 38 opening into a regulator box 39. The ports 38 may be fully or partially closed by a flap door or gate 40 hinged to the shaker box as at 41 and operated by a control lever 42 at either or both ends which lever is resiliently maintained in any position of adjustment by an arcuate bar 43 having a series of undulations formed in its surface.

In order that the shaker box 18 may hold a plurality of spaced screen units (6 as shown in the present embodiment) in fixed parallel position during oscillation, each box is provided with a supporting guide strip 44 which maintains the bottom of a screen unit 46 in proper vertical alignment with the ports 38. A plurality of spaced blocks 47 having rabbeted rear faces as at 48 are mounted on or integral with the guide strip 44 and secured to the shaker box wall between the apertures 38. The upper portion of the opposite or inner wall supports a bar 50 having a plurality of spaced threaded apertures for the reception of locking screws 52 the inner ends of which bear against the screen units to lock them in operative position within the shaker box 18.

Figure 7:
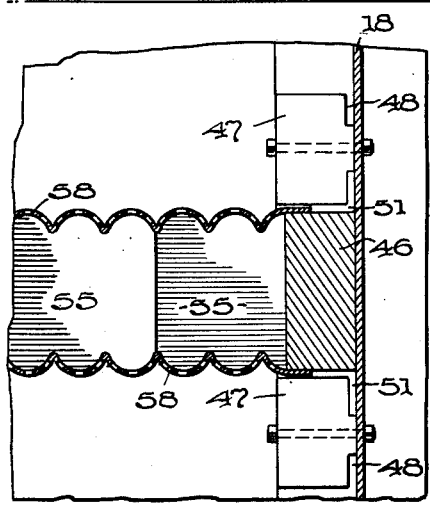
Figure 7 is a fragmentary horizontal sectional view to an enlarged scale taken on the line 7—7 of Figure 5 of part of the means for securing the screen units in a shaker box.
Figure 8:
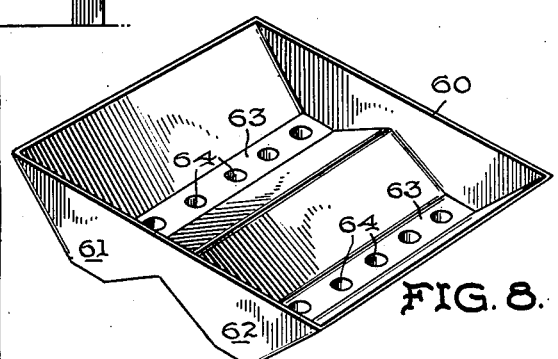
Figure 8 is a perspective view of the seed hopper.

Each screen unit 46 comprises a generally rectangular frame having an upwardly extending hose receiving spout 53 for the reception of seeds to be graded and an outlet aperture 54 which is accurately aligned with the shaker box port 38 by the blocks 47. The lower right-hand corner of each unit 46 is provided with a pair of vertically disposed angle guides 51 (Figures 6 and 7) which are received in the rabbet of the blocks 47. Thus the screws 52 and the blocks 47 and supporting guide strip 44 all cooperate to retain the screen units in perfectly aligned operative position during seed grading operations.

The screen unit 46 is provided with a plurality of spaced inclined chutes or flights 55, each of which extends from one wall but terminates short of the opposite wall with the next lower flight commencing from the latter wall to form a continuous, tortuous downwardly inclined passage 56. An important feature of the invention resides in the highly perforated sides 58 which may be of sheet metal, etc., and complete the screen unit 46 (Figures 6 and 7), the sides being pronouncedly scalloped in horizontal cross-section to increase the screening surface and agitation of the seeds being graded.

It will be noted that the screen units 46 are arranged in the shaker boxes 18 parallel to the direction of oscillation of the latter, or from end to end of the apparatus 10. Thus the seed moving along the inclined tortuous passage 56 is shaken along at maximum speed. However, the same motion throws the volume of seed against the scallops of the sides permitting the smaller desired seed to pass through the perforations and fall between the screen units 46 to the bottom 36 and thence to the discharge aperture 37. This action is continuously repeated throughout the passage 56 so that the scallops effect a far more efficient grading of the seed even though the seed is passed more quickly through the unit.

Moreover, as the gate 40 controls the flow of rejected seed into the regulator box 39, partial closing of the ports 38 will reduce the amount of this "over-run" by causing the seeds to stay in the units longer. Thus a very efficient control of the grading is provided regardless of the type of seed being graded.

As shown in Figures 1, 2, 5 and 9, a special feed hopper 60 is pivotally mounted on the frame members 17 by means of the hinges 71 which permit cleaning or dumping of the hopper as desired. The hopper 60 includes two lesser hopper sections 61 and 62, each of which is provided with a flat, narrow transversely extending bottom 63 having a plurality of apertures 64 formed therein. A discharge spout 66 depends from the hopper sections 61 and 62 in alignment with each aperture and supports a flexible hose section 68, the lower end of which projects loosely within the spout 53 of a screen unit. The hose is suitably clamped to the spout 66 and permits the seeds to flow from the hopper to the screen units during oscillation of the latter without loss of seed.

It is believed that the operation of the seed grading apparatus 10 is obvious from the foregoing description. When screen units having the desired size of apertures in their scalloped sides have been fixed in operative position in the shaker boxes 18 by means of the blocks 47 and the screws 52, energy is supplied to the motor M to initiate oscillation of the shaker boxes 18 and seed grading operations may be commenced.

The seed to be graded is discharged into the hopper 60 whence it is discharged through the hoppers 61 and 62 into each of the screen units 46 in the two shaker boxes 18 by means of the hose sections 68. The oscillation of the boxes moves the seeds rapidly along the tortuous passage 56 during which operation, the seeds are continually thrown against the scalloped sides 58 of the screen units. This permits the smaller desired seeds to pass through the perforated scallops, fall between the units 46 to the inclined shaker box floor 36 and pass out the discharge spout 37 and fall onto a portable elevator (if in the field) or into a bin elevator. It will be noted that the spouts 37 of both shaker boxes (Figure 1) are closely adjacent so that one elevator will serve both.

As the seed being graded nears the bottom of the screen units, the great bulk of it at this time will be rejected seed, that is, too large to pass through the perforations in the scalloped side walls 58. This rejected seed passes finally into the regulator box 39 from which it may be collected in any desired manner. If desired, of course, it may be rerun through the apparatus 10. However, the gate 40 may be manipulated so as to slow down the seeds passing through the passage 56 so that for most seeds, such rerun is unnecessary and unprofitable. At any time, the apparatus may be stopped, the screen units quickly changed for others having a different size of apertures to efficiently grade a different type of seed right in the field to thus provide a very flexible apparatus in use.

It will now be readily apparent that the apparatus comprising the present invention is particularly suitable for speedy and efficient seed grading operations in the field. It is particularly adapted for rice grading and by changing the screen units, it can readily handle other seeds during their harvest. The portability of the machine, the positive 2 way oscillation of the shaker boxes together with the scalloped perforated screen sides which practically eliminate screen clogging, the connection of the shaker arms to the mid-point of the shaker boxes to eliminate turning movement thereabout of the shaker boxes, the control of the flow of seeds through the apparatus, and the single hopper unit feeding all screen sections, all combine to produce an extremely rapid, efficient and yet economical rice and other seed grading apparatus.

It is to be understood that the terms "inner" and "outer" where used in the specification as in connection with the shaker box sides, etc., is intended to refer to the central part of the apparatus.

It is also to be understood that the form of my invention herewith shown and described is to be taken as a preferred example of the same and that various changes in the shape, size and arrangement of parts may be resorted to without departure from the spirit of the invention or the scope of the subjoined claims.

I claim:

1. A seed grader comprising a frame, a box suspended from said frame, a screen unit having perforations mounted in said box, means on said frame for directing seeds to said unit for downward gravity flow therethrough, said unit having an aperture for discharging seeds externally of said box, said box having a port aligned with said aperture, additional means on said frame for oscillating said box to effect a separation of the seeds in said unit through the perforations of said screen unit into said box and through said aperture and port, and a seed discharge spout formed in said box adjacent a lower corner thereof, the floor of said box communicating with the perforations in said screen unit and being inclined to deliver seeds to said spout.

2. An apparatus as recited in claim 1 wherein valve means are mounted on said box adjacent said aperture and port to vary the seed flow through said unit.

3. A seed grader comprising a frame, a box including spaced ports suspended from said frame, a plurality of boxlike, hollow screen units having perforations and including inlet and outlet apertures mounted in said box, means mounted in said box between said ports for holding said units in spaced parallel relationship and with said outlet apertures in alignment with said ports tor discharging seeds externally of said box, means mounted on said frame for directing seeds to said inlet apertures, and additional means on said frame for oscillating said box to effect a separation of the seeds in said units through the perforations of said screen units into said box and through said outlet apertures and ports.

4. An apparatus as recited in claim 2 wherein said units are arranged parallel to the direction of oscillation of said box.

5. An apparatus as recited in claim 2 wherein said units include a tortuous inclined seed path and the sides of said units are formed of perforated material having a scalloped horizontal cross section to increase the separating action.

6. An apparatus as recited in claim 2 wherein valve means are mounted on said box adjacent said ports to simultaneously vary the flow of seed through said units.

7. An apparatus as recited in claim 2 wherein said units include a tortuous, inclined seed path and sides of perforated material having a scalloped, horizontal cross section, and said units are arranged parallel to the direction of oscillation of said box to expedite the flow of seeds and increase the grading action of the scalloped sections.

8. A seed grader shaker box including screen units having discharge apertures, comprising front, rear and end sides and a bottom, a discharge spout for screened seeds formed adjacent a lower corner of said box, said bottom being inclined toward said corner to deliver screened seeds thereto by gravity, spaced ports formed in a side of said box, screen unit supporting and spacing means mounted on said bottom between said ports for aligning the discharge apertures of said units with said ports, and valve means mounted on said box for varying the flow of seeds through said units.

References Cited in the file of this patent

UNITED STATES PATENTS

| | | |
|---|---|---|
| 469,601 | Seck | Feb. 23, 1892 |
| 505,723 | Pollock | Sept. 26, 1893 |
| 542,884 | Fuchs | July 16, 1895 |
| 569,211 | Landes | Oct. 13, 1896 |
| 655,881 | Marmon | Aug. 14, 1900 |
| 791,425 | Johnson | May 30, 1905 |
| 841,585 | Seck | Jan. 15, 1907 |

FOREIGN PATENTS

| | | |
|---|---|---|
| 10,879 | Great Britain | of 1889 |
| 19,496 | Great Britain | of 1895 |